(12) United States Patent
Lefort (10) Patent No.: US 7,316,284 B2
(45) Date of Patent: Jan. 8, 2008

(54) SNOW VEHICLE

(76) Inventor: Christian Lefort, 1164, Chernin des Patriotes Ouest, St-Jean-sur-Richelie, QUE (CA), J2Y 1H4

( * ) Notice: Subject to any disclaimer, the term of this patent is extended or adjusted under 35 U.S.C. 154(b) by 198 days.

(21) Appl. No.: 10/874,204

(22) Filed: Jun. 24, 2004

(65) Prior Publication Data

US 2004/0262064 A1 Dec. 30, 2004

(30) Foreign Application Priority Data

Jun. 24, 2003 (GB) ............................................. 0314633

(51) Int. Cl.
*B62M 27/00* (2006.01)

(52) U.S. Cl. .................................. 180/190; 296/136.01
(58) Field of Classification Search ......... 180/182–196; 296/136.01, 136.02, 104
See application file for complete search history.

(56) References Cited

U.S. PATENT DOCUMENTS

| | | | | | |
|---|---|---|---|---|---|
| 2,970,662 | A | * | 2/1961 | Hetteen ........................ | 180/190 |
| 3,578,095 | A | * | 5/1971 | Hauser ......................... | 180/190 |
| 3,599,740 | A | * | 8/1971 | Martinmaas ................. | 180/190 |
| 3,664,446 | A | * | 5/1972 | Burtis et al. ................. | 180/184 |
| 3,814,197 | A | * | 6/1974 | Milankov et al. ............ | 180/182 |
| 3,877,533 | A | * | 4/1975 | Maziarka et al. ............ | 180/190 |
| 4,633,964 | A | * | 1/1987 | Boyer et al. ................. | 180/190 |
| 5,014,805 | A | * | 5/1991 | Uchida ......................... | 180/184 |
| 5,673,772 | A | * | 10/1997 | Martin .......................... | 188/6 |
| 5,720,312 | A | * | 2/1998 | Scheuermann ........... | 135/88.09 |

* cited by examiner

*Primary Examiner*—Tony Winner

(57) ABSTRACT

A vehicle including a frame, a seat attached to the frame front section for supporting the driver in a sitting position, a protective shell attached to the frame front section for substantially enclosing the driver and a pair of skis for gliding on a supporting surface. The skis are pivotally attached to the frame front section substantially laterally on each side of the cabin. The skis are coupled to a steering wheel located in the cabin by a steering assembly for allowing the driver to steer the vehicle by pivoting the skis relative to the frame. The vehicle also includes a propelling assembly having an endless track operatively mounted to the frame rear section rearwardly relative to the seat for contacting the supporting surface and propelling the vehicle. A motor is mounted on the frame rear section in a substantially overlying and proximal relationship relative to the endless track. The motor is operatively coupled to the endless track for driving the latter. The seat and the motor are in a substantially proximal relationship relative to the supporting surface when the skis and the endless track contact the supporting surface.

19 Claims, 6 Drawing Sheets

SNOW VEHICLE

FIELD OF THE INVENTION

The present invention relates to the field of vehicles and is particularly concerned with a snow vehicle.

BACKGROUND OF THE INVENTION

Snowmobiles have been used for a number of years. Most snowmobiles typically include a frame, a pair of skis mounted to the frame for steering and support and at least one crawler track coupled to a motor for motive force.

A number of body styles have been contemplated based on design choices and intended utility. Because of the nature of the medium on which the vehicle is intended to travel, steering and control of conventional snowmobiles can be difficult. Since snowmobiles are used on a variety of terrains, vehicle stability is also of importance.

One of the drawbacks associated with conventional snowmobile frame designs is that the centre of gravity of the snowmobile being relatively high, the overall stability and control over the steering of such vehicles are often left to be desired. Accordingly, there exists a need for an improved snowmobile.

It is a general object of the present invention to provide such an improved snowmobile. Advantages of the present invention include that the proposed snowmobile allows for its intended users to be seated at a relatively low level so as to improve the overall stability and steering control of the vehicle. Also, in at least one embodiment of the invention, the intended users are adapted to be positioned in a substantially overlying relationship relative to the steering skis and in front of the crawler track further improves stability and steering control.

Also, despite a relatively low positioning of the intended users, the proposed vehicle allows for comfortable seating in a suitable protective enclosure so as to allow for enjoyable riding.

Another advantage of the present invention resides in that the proposed snowmobile and snowmobile frame are designed so as to be manufacturable using conventional forms of manufacturing so as to provide a snowmobile that will be economically feasible, long-lasting and relatively trouble-free in operation.

SUMMARY OF THE INVENTION

In accordance with an embodiment of the invention, there is provided a vehicle usable by a driver over a supporting surface, the driver having driver legs and driver arms, the vehicle comprising: a frame, the frame defining a frame front section and a frame rear section; a seat attached to the frame front section for supporting the driver in a sitting position; a protective shell attached to the frame front section for substantially enclosing the driver; a pair of skis for gliding on the supporting surface, the skis being pivotally attached to the frame front section substantially laterally on each side of the cabin, the skis being operatively coupled to a steering wheel located in the cabin by a steering assembly for allowing the driver to steer the vehicle by pivoting the skis relative to the frame; a propelling assembly including an endless track operatively mounted to the frame rear section rearwardly relative to the seat for contacting the supporting surface and propelling the vehicle; a motor mounted on the frame rear section in a substantially overlying and proximal relationship relative to the endless track, the motor being operatively coupled to the endless track for driving the latter; whereby the seat and the motor are in a substantially proximal relationship relative to the supporting surface when the skis and the endless track contact the supporting surface.

Conveniently, the endless track defines a track lower portion and a substantially opposed track upper portion; the propelling assembly also including a driving wheel mechanically coupled to the motor, the driving wheel engaging the endless track for driving the latter; a slide bar attached to the frame rear section, the slide bar defining a slide bar front end and a longitudinally opposed slide bar rear end; the slide bar being positioned so as to be in sliding contact with the inner face of at least a portion of the endless track lower portion; a front bogie wheel and a rear bogie wheel for engaging the inner face of the endless track, the front and rear bogie wheels being both rotatably attached to the slide bar for rotation relative thereto respectively substantially adjacent the slide bar front and rear ends; the configuration and size of the propelling assembly being selected to cause the normally and statically loaded vehicle to be supported by the endless track lower portion more towards the front of the latter then towards the rear of the latter.

Typically, the rear bogie wheel and the adjacent portions of the endless track are elevated above the front bogie wheel and adjacent portions of the endless track.

Conveniently, the driving wheel is located both forwardly and upwardly relative to the front bogie wheel so as to define an endless track front section extending between the driving wheel and the front bogie wheel, the endless track front section being slanted substantially upwardly in the forward direction.

Typically, the slide bar has a slide bar front segment extending substantially from the front bogie wheel towards the driving wheel for contacting at least a portion of the inner face of the endless track front section.

Conveniently, the propelling assembly also includes an intermediate bogie wheel located between the front and rear bogie wheels, the front and intermediate bogie wheels being located substantially in the same horizontal plane, the endless track lower portion defining a track rear section extending between the intermediate and rear bogie wheels, the endless track rear section being slanted substantially upwardly in the rearward direction; a track intermediate section extending between the front and intermediate bogie wheels, the track intermediate section being located below the remainder of the endless track so as to support a greater portion of the weight of the vehicle then other sections of the endless track when the vehicle is normally and statically loaded.

Typically, the slide bar has a slide bar rear segment extending substantially from the intermediate bogie wheel toward the rear bogie wheel for contacting at least a portion of the inner face of the endless track rear section and a slide bar intermediate segment extending between the front and intermediate bogie wheels for contacting at least a portion of the inner face of the endless track intermediate section.

Conveniently, the track front and intermediate segments define an obtuse front-to-intermediate segment angle therebetween, the track rear and intermediate segments defining an obtuse rear-to-intermediate angle therebetween, the front-to-intermediate segment angle being smaller then the rear-to-intermediate segment angle.

Typically, the propelling assembly also includes a suspension assembly connecting the slide bar to the frame rear section, the suspension assembly allowing a substantially vertical movement of the endless track relative to the frame rear section and biasing the slide bar away from the frame rear section toward the supporting surface; the configuration, size and characteristics of the suspension assembly being selected to also cause the normally and statically loaded vehicle to be supported by the endless track lower portion more towards the front of the latter then towards the rear of the latter.

Conveniently, the suspension assembly is configured and sized for allowing the endless track to controllably pivot about the driving wheel.

Typically, the suspension assembly includes a first suspension arm, the first suspension arm being pivotally coupled to the frame rear section substantially adjacent the rear section rear end, the first suspension arm defining a first arm first segment protruding above the frame rear section and a first arm second segment extending below the frame rear segment, the first suspension arm extending generally at an angle and downwardly in a rearward direction; a second suspension arm pivotally attached at opposed longitudinal ends thereof respectively to the first suspension arm adjacent a lower end of the latter and to the slide bar rear segment; a third suspension arm, the third suspension arm being pivotally attached at opposed longitudinal ends thereof respectively to the frame rear section substantially adjacent the rear section front end and to the slide bar intermediate segment; a first suspension biasing component mounted between the frame rear section in front of the first suspension arm and the first arm first segment for biasing the first arm first segment away from the frame rear section; a second suspension biasing component mounted between the frame rear section in front of the third suspension arm and the slide bar adjacent the intersection between the slide bar front and intermediate segments for biasing the slide bar away from the frame rear section.

Conveniently, the endless track defines a track upper portion and a track lower portion, the propelling assembly also including a suspension assembly connecting the slide bar to the frame rear section, the suspensions assembly allowing a substantially vertical movement of the endless track relative to the frame rear section between an extended configuration wherein the endless track is more spaced relative to the frame rear section and a retracted configuration wherein the endless track is more proximal relative to the frame rear section; the range of the substantially vertical movement of the endless track relative to the frame rear section being such that at least a section of the track upper portion is located above at least a portion of the motor when the endless track is in the retracted configuration; the propelling assembly further including a deflecting wheel rotatably mounted to the vehicle for engaging the endless track and deflecting the track upper portion so as to prevent the latter from contacting the motor when the endless track is in the retracted configuration.

Typically, the frame front section includes a pair of seat supporting arms extending substantially forwardly from the frame rear section, the seat supporting arms extending on each side of the seat in a substantially proximal relationship with the latter, the seat being exclusively secured to the so as to allow the seat to be in a proximal relationship with the supporting surface.

Conveniently, the seat includes a bench section and a back rest section, the skis and the seat being positioned relative to each other so that at least a portion of the skis is positioned laterally relative to at least a portion of the bench section in register with the latter.

Typically, the frame front section also includes a cabin base wall extending substantially forwardly from the seat supporting arms, the cabin base wall defining a substantially horizontal base wall spacing segment extending from the seat supporting arms and a base wall foot resting segment extending at an angle from the base wall spacing segment; the protective shell being pivotally attached to the cabin base wall for pivotal movement between an open configuration facilitating movement of the driver in and out of the seat and a closed configuration wherein the protective shell protectively shields the driver from external elements.

Conveniently, the steering assembly includes a steering column mechanically coupled to the steering wheel, the steering column extending substantially forwardly and being configured and sized for allowing the driver legs to extend underneath the steering wheel.

Typically, the steering assembly includes suspension tables and driving rods attached to the skis respectively for resiliently biasing the skis towards the supporting surface and driving the skis, the seat being configured, sized and positioned so as to allow the driver to sit in a substantially recumbent position with the driver legs in a substantially overlying relationship relative to the suspension tables and driving rods.

Conveniently, at least one of the skis is provided with a braking tongue pivotally attached thereto for selective pivotal movement between a braking configuration wherein the braking tongue protrudes from the gliding surface of the at least one ski to frictionally contact the supporting surface and a gliding configuration wherein the braking tongue is positioned so as not to interfere substantially with the supporting surface.

Typically, the at least one ski is provided with a ski aperture extending therethrough for allowing the braking tongue to pivot between the gliding configuration wherein the braking tongue fills the ski aperture and is in a coplanar relationship with the ski gliding surface and the braking configuration wherein the braking tongue protrudes from the ski gliding surface; the braking tongue being operatively coupled to a tongue actuating means for allowing the driver to selectively pivot the braking tongue.

Conveniently, the at least one ski is provided with ski flanges extending substantially upwardly therefrom substantially adjacent its lateral edges, the braking tongue being attached to a tongue axle extending between the ski flanges; the tongue actuating means including an actuating piston extending between the at least one ski and the braking tongue for selectively pivoting the latter.

BRIEF DESCRIPTION OF THE DRAWINGS

Embodiments of the present invention will now be disclosed, by way of example, in reference to the following drawings, in which.

DETAILED DESCRIPTION

Figure 1:
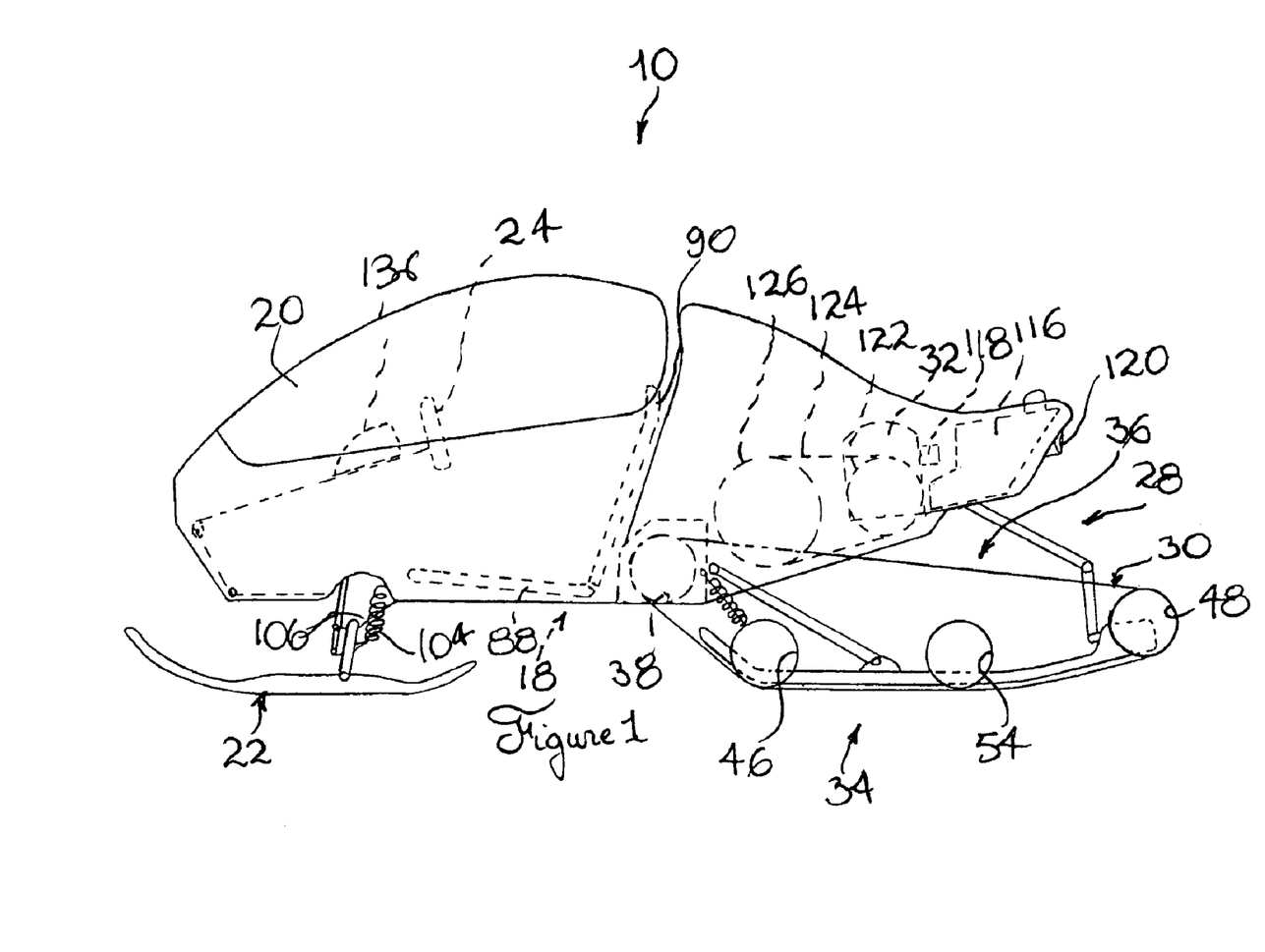
FIG. 1, in an elevational view, illustrates a snow vehicle in accordance with an embodiment of the present invention.

Referring to FIG. 1, there is shown a vehicle in accordance with an embodiment of the present invention, generally indicated by the reference numeral 10.

The vehicle 10 is adapted to be used by a driver (not shown) over a supporting surface (also not shown). Typically, the vehicle 10 is intended to be used over a surface covered by snow, ice or the like, although the vehicle 10 could be used in other contexts such as over sand or any other suitable supporting surface without departing from the scope of the present invention.

Figure 5:
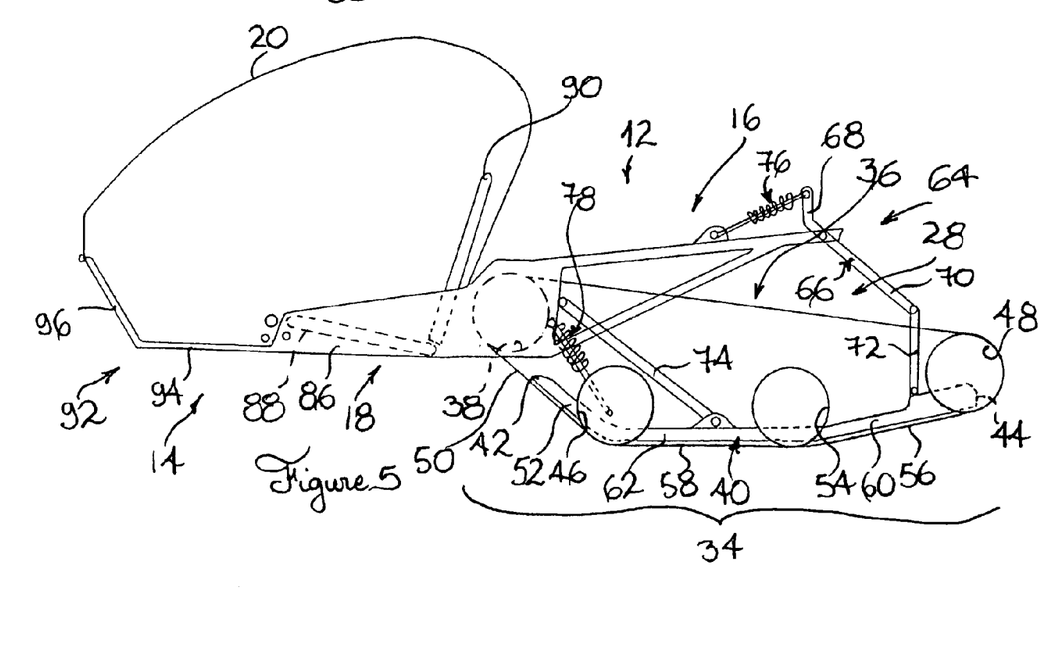
FIG. 5, in a partial side elevational view, illustrates part of the snow vehicle shown in FIGS. 1 and 2.

In general terms, the vehicle 10 includes a frame 12 illustrated in greater details in FIG. 5. The frame 12 defines a frame front section 14 and a frame rear section 16. The vehicle 10 also includes a seat 18 attached to the frame front section 14 for supporting a driver in a sitting position. The vehicle 10 further includes a protective shell 20 attached to the frame front section 14 for substantially enclosing the driver.

Figures 2, 3, 4:
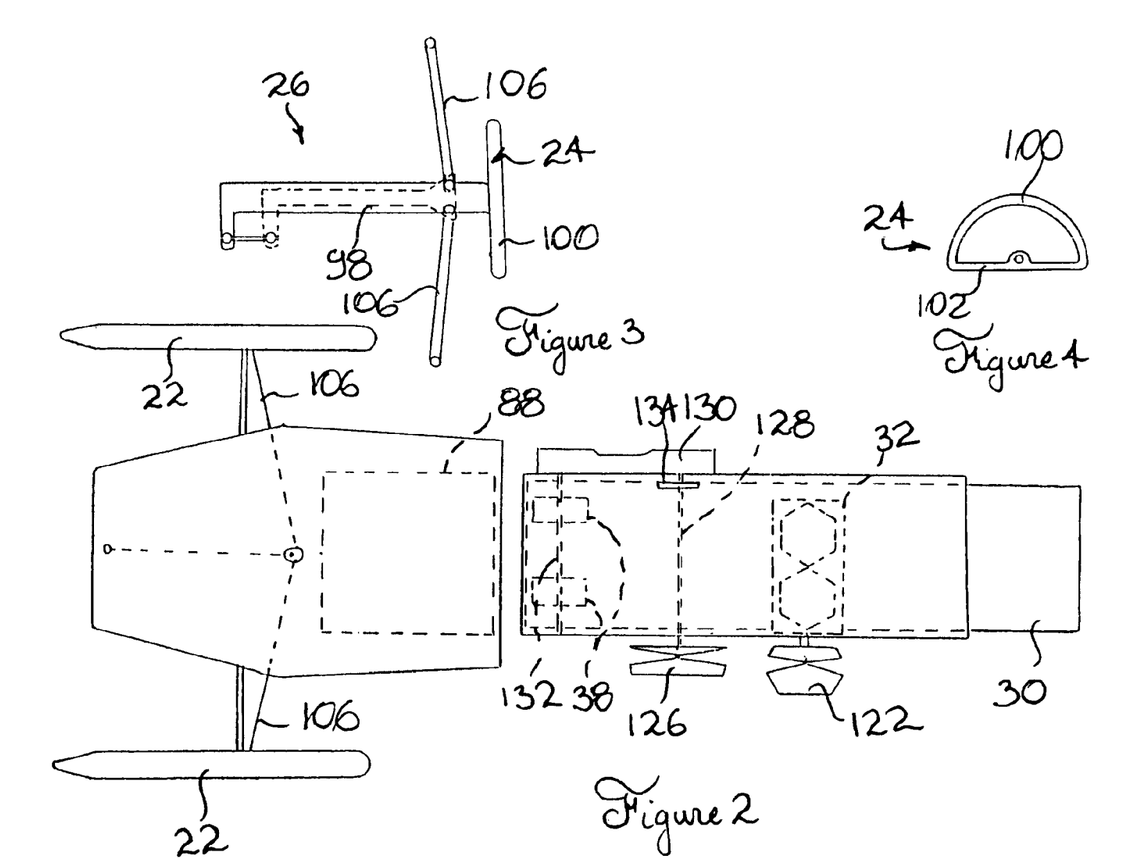
FIG. 2, in a partial top view with sections taken out, illustrates part of the snow vehicle shown in FIG. 1.
FIG. 3, in a partial top view with sections taken out, illustrates some of the components of the steering assembly part of the snow vehicle in accordance with an embodiment of the present invention.
FIG. 4, in a front elevational view, illustrates the configuration of a steering wheel part of the steering assembly shown in FIG. 3.

As illustrated more specifically in FIGS. 1 and 2, the vehicle 10 also includes a pair of skis 22 for gliding on the supporting surface. The skis 22 are pivotally attached to the frame front section 14 substantially laterally on each side of the cabin 20. The skis 22 are operatively coupled to a steering wheel 24 located in the cabin 20 by a steering assembly 26 for allowing the driver to steer the vehicle 10 by pivoting the skis 22 relative to the frame 12.

The vehicle 10 further includes a propelling assembly 28 including an endless track 30 operatively mounted to the frame rear section 16 rearwardly relative to the seat 18 for contacting the supporting surface and propelling the vehicle 10. The vehicle 10 further includes a motor 32 mounted on the frame rear section 16 in a substantially overlying and proximal relationship relative to the endless track 30. The motor 32 is operatively coupled to the endless track 30 for driving the latter.

The seat 18 and the motor 32 are in a substantially proximal relationship relative to the supporting surface when the skis 22 and the endless track 30 contact the supporting surface. Typically, the endless track 30 defines a track lower portion 34 and a substantially opposed track upper portion 36.

As illustrated more specifically in FIG. 5, the propelling assembly 28 typically includes a driving wheel 38 mechanically coupled to the motor 32. The driving wheel 38 engages the endless track 30 for driving the latter. The propelling assembly 28 also includes a slide bar 40 attached to the frame rear section 16. The slide bar 40 defines a slide bar front end 42 and a longitudinally opposed slide bar rear end 44. The slide bar 40 is positioned so as to be in sliding contact with the inner face of at least a portion of the endless track lower portion 34.

The propelling assembly 28 further includes a front bogie wheel 46 and a rear bogie wheel 48 for engaging the inner face of the endless track 30. The front and rear bogie wheel 46, 48 are both rotatably attached to the slide bar 40 for rotation relative thereto respectively substantially adjacent the slide bar front and rear ends 42, 44.

The configuration and size of the propelling assembly 28 is selected to cause the normally and statically loaded vehicle 10 to be supported by the endless track lower portion 34 more towards the front of the latter than towards the rear of the latter. The configuration of the propelling assembly 28 is adapted to at least partially counteract the propensity of the weight to be overly distributed on the skis 22 as a result of the driving being typically heavier than the motor 32. In other words, by having the propelling assembly 28 configured and sized so that the weight supported by the endless track is distributed more towards its frontward end, some of the weight is relieved from the skis 22 in order to prevent too much weight being supported on the latter as a result of the driver being typically heavier than the motor 32.

Typically, the rear bogie wheel 48 and adjacent portions of the endless track 30 are elevated above the front bogie wheel 46 and adjacent portions of the endless track 30. Typically, the driving wheel 38 is located both forwardly and upwardly relative to the front bogie wheel 46 so as to define an endless track front section 50 extending between the driving wheel 38 and the front bogie wheel 46. The endless track front section 50 is typically slanted substantially upwardly in the forward direction.

The slide bar 40 typically has a corresponding slide bar front segment 52 extending from a position substantially adjacent the front bogie wheel 46 towards a position substantially adjacent the driving wheel 38. The slide bar front segment 52 is configured for contacting at least a portion of the inner face of the endless track front section 50.

Typically, the propelling assembly 28 also includes an intermediate bogie wheel 54 located between the front and rear bogie wheels 46, 48. The front and intermediate bogie wheels 46, 54 are typically located substantially in the same horizontal plane.

Accordingly, the endless track lower portion 34 typically defines a track rear section 56 extending between the intermediate and rear bogie wheels 54, 48. The endless track rear section 56 is typically slanted substantially upwardly in the rearward direction.

The track lower portion 34 typically also defines a track intermediate section 58 extending between the front and intermediate bogie wheel 46, 54. The track intermediate section 58 is located below the remainder of the endless track 30 so as to support a greater portion of the weight of the vehicle 10 than other sections of the endless track 30 when the vehicle 10 is normally and statically loaded.

The slide bar 40 typically has a corresponding slide bar rear segment 60 extending substantially from a position located adjacent the intermediate bogie wheel 54 towards a position located adjacent the rear bogie wheel 48 for contacting at least a portion of the inner face of the endless track rear section. The slide bar 40 typically also has a slide bar intermediate segment 62 extending between positions located substantially adjacent the front and intermediate bogie wheels 46, 54 for contacting at least a portion of the inner face of the endless track intermediate section 58.

Typically, the track front and intermediate segments 50, 58 define an obtuse front-to-intermediate segment angle therebetween. Similarly, the track rear and intermediate segments 56, 58 define an obtuse rear-to-intermediate angle therebetween. Typically, the front-to-intermediate segment angle is smaller than the rear-to-intermediate angle. Typically, although by no means exclusively, the front-to-intermediate segment angle has a value substantially in the range of 135 degrees whereas the rear-to-intermediate segment angle has a value substantially in the range of 165 degrees.

Typically, the propelling assembly 28 further includes a suspension assembly 64 connecting the slide bar 40 to the frame rear section 16. The suspension assembly 64 allows a substantially vertical movement of the endless track 30 relative to the frame rear section and biases the slide bar 40 away from the frame rear section 16 towards the supporting surface. The configuration, size and characteristics of the suspension assembly 64 are selected to also cause the normally and statically loaded vehicle 10 to be supported by the endless track lower portion 34 more towards the front of the latter rather than towards the rear of the latter.

Figure 8:
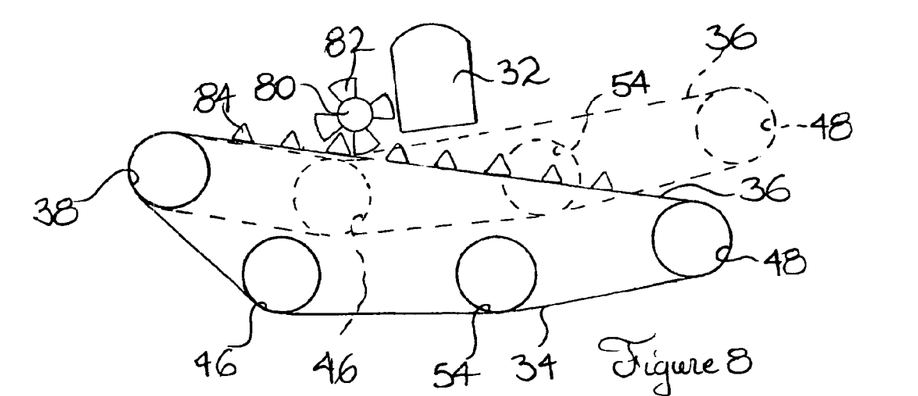
FIG. 8, in a schematic partial side elevational view with sections taken out, illustrates the movement of an endless track part of a driving assembly of a snow vehicle in accordance with an embodiment of the present invention as the endless track moves between an extended configuration shown in full lines and a retracted configuration shown in phantom lines.
Figure 9:
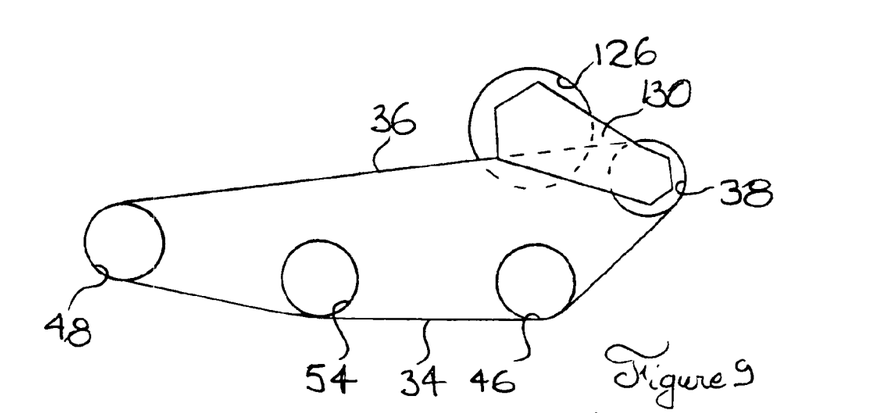
FIG. 9, in a side elevational view, illustrates other components part of the driving assembly shown in FIGS. 7 and 8.

As illustrated more specifically in FIG. 8, the suspension assembly 64 allows a substantially vertical movement of the endless track 30 relative to the frame rear section 16 between an extended configuration shown in full lines wherein the endless track 30 is more spaced relative to the frame rear section 16 and a retracted configuration shown in phantom lines wherein the endless track 30 is more proximal relative to the frame rear section 16.

As shown in FIG. 8, typically, the suspension assembly 64 is configured and sized for allowing the endless track 30 to controllably pivot about the driving wheel 38 between the extended and retracted configurations. Typically, the range of movement is substantially in the range of 10 inches adjacent the rear of the endless track 30 and 7 inches adjacent the front of the endless track 30. It should, however, be under stood that other ranges could be used without departing from the scope of the present invention.

As illustrated more specifically in FIG. 5, the suspension assembly 64 typically includes a first suspension arm 66 pivotally coupled to the frame rear section 16 substantially adjacent the rear section rear end. The first suspension arm defines a first arm first segment 68 protruding above the frame rear section 16 and a first arm second segment 70 extending generally as an angle and downwardly in a rearward direction. The suspension assembly 64 also includes a second suspension arm 72 pivotally attached at opposed longitudinal ends thereof respectively to the first suspension arm 70 adjacent a lower end of the latter and to the slide bar rear segment 60.

The suspension assembly 64 further includes a third suspension arm 74 pivotally attached at opposed longitudinal ends thereof respectively to the frame rear section 16 adjacent a rear section front end and to the slide bar intermediate segment 62. The suspension assembly 64 further includes a first suspension biasing component 76 mounted between the frame rear section 16 in front of the first suspension arm 66 and the first arm first segment 68 for biasing the first arm first segment 68 rearwardly and away from the frame rear section 16. The suspension assembly 64 still further includes a second suspension biasing component 78 mounted between the frame rear section 16 in front of the third suspension arm 74 and the slide bar 40 adjacent the intersection between the slide bar front and intermediate segments 52, 62 for biasing the slide bar 40 away from the frame rear section 16.

As illustrated more specifically in FIG. 8, the range of the substantially vertical movement of the endless track 30 relative to the frame rear section 16 is such that at least a section of the track upper portion 36 is located above at least a portion of the motor 32 when the endless track 30 is in the retracted configuration shown in phantom lines. The propelling assembly 28 further includes a deflecting wheel 80 rotatably mounted to the vehicle 10 for engaging the endless track 30 and deflecting the track upper portion 36 so as to prevent the latter from contacting the motor 32 when the endless track is in the retracted configuration. Typically, the deflecting wheel 80 is provided with deflecting wheel teeth 82 configured and sized for cooperating with endless track teeth 84 protruding from the outer surface of the endless track 30.

Figure 6:
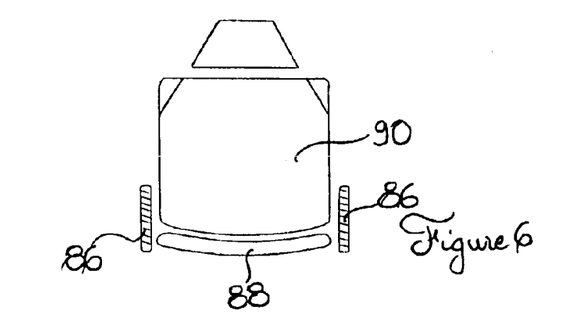
FIG. 6, in a transversal cross-sectional view with sections taken out, illustrates some of the features of the snow vehicle shown in FIG. 5.
Figure 7:
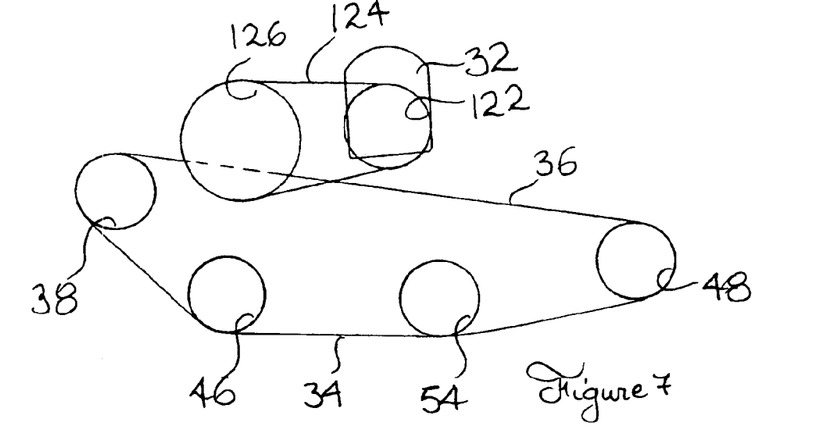
FIG. 7, in a schematic partial side view, illustrates some of the components part of a driving assembly of the snow vehicle such as shown in FIGS. 1 through 6.

As illustrated more specifically in FIG. 6, the frame front section 14 typically includes a pair of seat supporting arms 86 extending substantially forwardly from the frame rear section 16. The seat supporting arms 86 extend on each side of the seat 18 in a substantially proximal relationship with the latter. Typically, the seat 18 is exclusively secured to the seat supporting arms 86 so as to allow the seat 18 to be in a proximal relationship with the supporting surface.

Typically, the seat 18 includes a bench section 88 for receiving the buttocks of the driver and a backrest section 90. As shown more specifically in FIG. 2, the skis 22 and seat 18 are typically positioned relative to each other so that at least a portion of the skis 22 is positioned laterally relative to at least a portion of the bench section 88 in register with the latter.

As shown more specifically in FIG. 5, the frame front section 14 also includes a cabin base wall 92 extending substantially forwardly from the seat supporting arms 86. The cabin base wall 92 defines a substantially horizontal base wall spacing segment 94 extending from the seat supporting arms 86 and a base wall foot resting segment 96 extending at an angle from the base wall spacing segment 94. The protective shell 20 is typically pivotally attached to the cabin base wall 92 for pivotal movement between an open configuration (not shown) facilitating movement of the driver in and out of the seat 18 and a closed configuration wherein the protective shell 20 protectively shields the driver from external elements.

As illustrated more specifically in FIG. 3, the steering assembly 26 typically includes a steering column 98 mechanically coupled to the steering wheel 24. The steering column 98 typically extends substantially forwardly and is configured and sized for allowing the legs of the driver to extend underneath the steering wheel 24. Also, as shown in FIG. 4, the steering wheel 24 typically has a semi-circular general configuration defining an annular steering wheel grasping segment 100 and a substantially rectilinear steering wheel clearing segment 102. The steering wheel clearing segment 102 being configured, positioned and sized so as to facilitate insertion of the legs of the driver thereunderneath.

As illustrated more specifically in FIGS. 1 and 2, the steering assembly 26 also includes suspension tables 104 and driving rods 106 attached to the skis 22 respectively for resiliently biasing the skis 22 towards the supporting surface and driving the skis 22. The seat 18 is configured, sized and positioned so as to allow the driver to sit in substantially recumbent position with the legs of the driver in a substantially overlying relationship relative to the suspension tables and driving rods 104, 106.

Figures 10, 11, 12, 13:
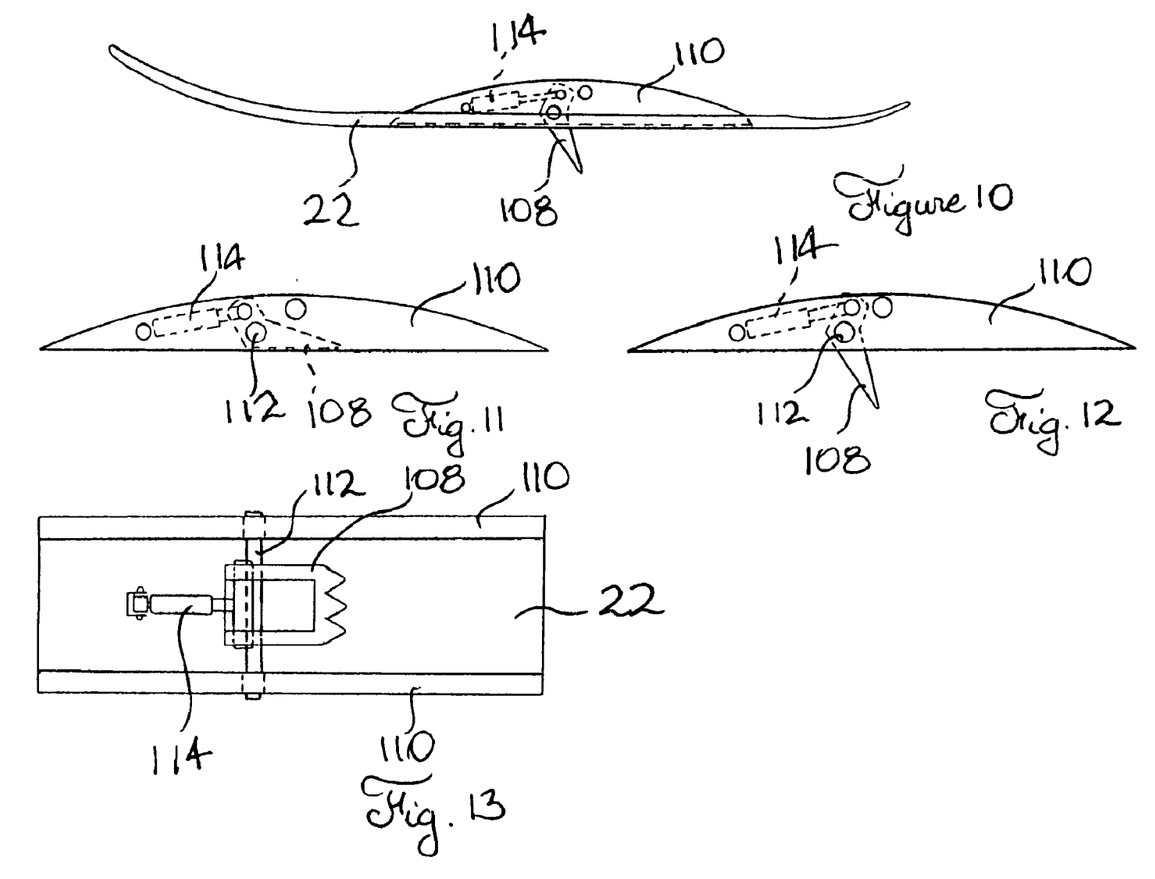
FIG. 10, in a side elevational view, illustrates a ski component part of the snow vehicle in accordance with an embodiment of the present invention, the ski component being shown with a braking tongue extending therefrom in a braking configuration.
FIG. 11, in a close-up view, illustrates part of the ski shown in FIG. 10 with its braking tongue in a retracted configuration.
FIG. 12, in a close-up view, illustrates the braking tongue shown in FIG. 10 in a braking configuration.
FIG. 13, in a partial top view with sections taken out, illustrates part of the ski shown in FIG. 10 with its braking tongue in a gliding configuration.

As illustrated more specifically in FIGS. 10 through 13, at least one and preferably both skis 22 are provided with a braking tongue 108 pivotally attached thereto for selective pivotal movement between a braking configuration shown in FIGS. 10 and 12 wherein the braking tongue 108 protrudes from the gliding surface of the corresponding ski 22 to frictionally contact the supporting surface in a gliding configuration shown in FIGS. 11 and 13 wherein the braking tongue 108 is positioned so as not to interfere substantially with the supporting surface. Typically, each ski 22 is provided with a corresponding ski aperture extending therethrough for allowing the braking tongue 108 to pivot between a gliding configuration wherein the braking tongue 108 fills the ski aperture and is in a co-planar relationship with the ski gliding surface and a braking configuration wherein the braking tongue protrudes from the ski gliding surface.

The braking tongue is operatively coupled to a tongue actuating means for allowing the driver to selectively pivot the braking tongue 108. Typically, each ski is provided with ski flanges 110 extending substantially upwardly therefrom substantially adjacent its lateral edges. The braking tongue 108 is attached to a tongue axle 112 extending between the ski flanges 110. The tongue actuating means typically includes an actuating piston 114 extending between the upper surface of the ski 22 and the braking tongue 108 for selectively pivoting the latter. The braking tongues are adapted to be used as emergency brakes for braking the vehicle 10 in situations wherein the endless track 30 loses adherence with the support surface.

Typically, the brake actuating piston 114 is a hydraulic-type cylinder although other actuating means such as a cable or the like could be used without departing from the scope of the present invention.

The motor 10 could be of any suitable type such as a conventional 2-step internal combustion engine or the like. As illustrated more specifically in FIG. 1, when an internal combustion engine is used, the motor 32 is typically coupled to a gas tank 116. The motor 32 is also typically provided with a carburettor 118. Furthermore, the motor 32 is typically provided with an exhaust having a muffler component 120.

Typically, the output shaft of the motor 32 is mechanically coupled to a clutch component 122. As is well known in the art, the clutch component 122 is typically coupled by a belt component 124 to a cam-pulley 126.

As shown in FIG. 2, the cam-pulley 126 is mounted on a pulley shaft 128 for driving a driving chain (not shown) protectively enclosed within a chain casing 130. The driving chain (not shown) is mechanically coupled to a driven axle 132 for driving a pair of driving wheels 38. Again, it should be understood that other motor means could be used for driving at least one and preferably two driving wheels 38 without departing from the scope of the present invention.

Typically, conventional braking means are provided for braking the vehicle 10. These conventional braking means may include a braking disc 134 mounted on the pulley shaft 128 and adapted to be selectively frictionally retained by conventional braking callipers or the like.

Also, as illustrated schematically in FIG. 1, the vehicle 10 is typically provided with monitoring means for monitoring the functioning of its various components such as an odometer 136 mounted adjacent the steering wheel 24 for monitoring the speed of the vehicle 10.

Figure 14:
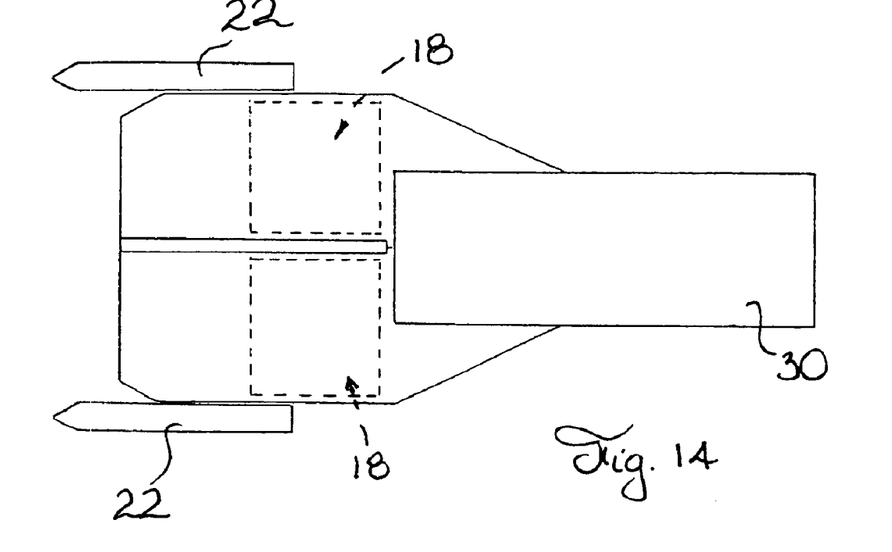
FIG. 14, in a schematic top view, illustrates a snow vehicle in accordance with an alternative embodiment of the invention, the snow vehicle being adapted for use by two occupants.
Figure 15:
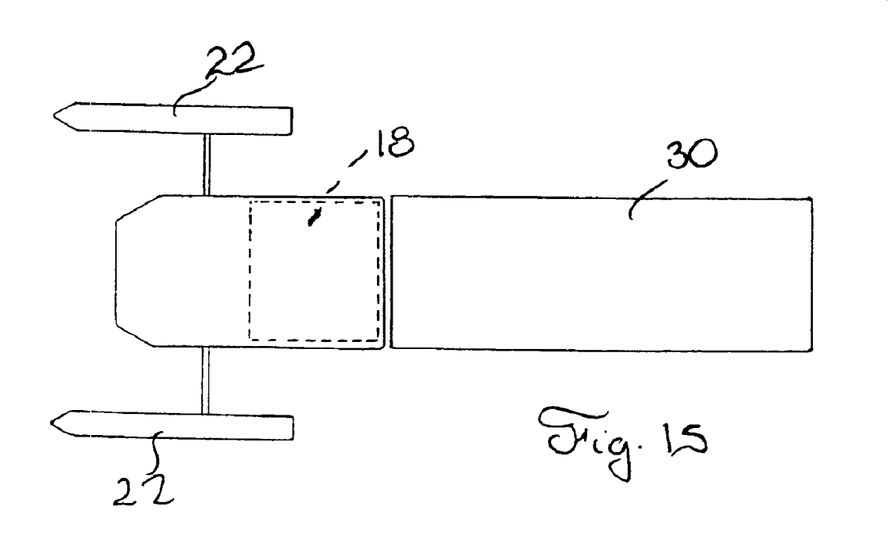
FIG. 15, in a top schematic view with sections taken out, illustrates, in comparison, a configuration of a single-occupant snow vehicle in accordance with the present invention.

FIG. 14 illustrates an alternative embodiment of the invention wherein a vehicle 10' includes a pair of seats 18 positioned in a side by side relationship relative to each other.

The embodiments of the invention in which an exclusive privilege or property is claimed are defined as follows:

1. A vehicle usable by a driver over a supporting surface, said driver having driver legs and driver arms, said vehicle comprising:

a frame, said frame defining a frame front section and a frame rear section;

a seat attached to said frame front section for supporting said driver in a sitting position;

a protective shell attached to said frame front section substantially enclosing said driver to form a cabin;

a pair of skis for gliding on said supporting surface, said skis being pivotally attached to said frame front section substantially laterally on each side of said cabin, said skis being operatively coupled to a steering wheel located in said cabin by a steering assembly for allowing said driver to steer said vehicle by pivoting said skis relative to said frame;

a propelling assembly including an endless track operatively mounted to said frame rear section rearwardly relative to said seat for contacting said supporting surface and propelling said vehicle;

a motor mounted on said frame rear section in a substantially overlying and proximal relationship relative to said endless track, said motor being operatively coupled to said endless track for driving the latter;

whereby said seat and said motor are in a substantially proximal relationship relative to said supporting surface when said skis and said endless track contact said supporting surface;

said endless track defining a track lower portion and a substantially opposed track upper portion; said propelling assembly also including a driving wheel mechanically coupled to said motor, said driving wheel engaging said endless track for driving the latter;

a slide bar attached to said frame rear section, said slide bar defining a slide bar front end and a longitudinally opposed slide bar rear end; said slide bar being positioned so as to be in sliding contact with the inner face of at least a portion of said endless track lower portion;

a front bogie wheel and a rear bogie wheel for engaging the inner face of said endless track, said front and rear bogie wheels being both rotatably attached to said slide bar for rotation relative thereto respectively substantially adjacent said slide bar front and rear ends;

the configuration and size of said propelling assembly being selected to cause the normally and statically loaded vehicle to be supported by said endless track lower portion more towards the front of the latter then towards the rear of the latter.

2. A vehicle as recited in claim 1 wherein said endless track defines a track lower portion and a substantially opposed track upper portion; said propelling assembly also including
- a driving wheel mechanically coupled to said motor, said driving wheel engaging said endless track for driving the latter;
- a slide bar attached to said frame rear section, said slide bar defining a slide bar front end and a longitudinally opposed slide bar rear end; said slide bar being positioned so as to be in sliding contact with the inner face of at least a portion of said endless track lower portion;
- a front bogie wheel and a rear bogie wheel for engaging the inner face of said endless track, said front and rear bogie wheels being both rotatably attached to said slide bar for rotation relative thereto respectively substantially adjacent said slide bar front and rear ends;
- the configuration and size of said propelling assembly being selected to cause the normally and statically loaded vehicle to be supported by said endless track lower portion more towards the front of the latter then towards the rear of the latter.

3. A vehicle as recited in claim 2 wherein said rear bogie wheel and the adjacent portions of said endless track are elevated above said front bogie wheel and adjacent portions of said endless track.

4. A vehicle as recited in claim 3 wherein said driving wheel is located both forwardly and upwardly relative to said front bogie wheel so as to define an endless track front section extending between said driving wheel and said front bogie wheel, said endless track front section being slanted substantially upwardly in the forward direction.

5. A vehicle as recited in claim 4 wherein said slide bar has a slide bar front segment extending substantially from said front bogie wheel towards said driving wheel for contacting at least a portion of the inner face of said endless track front section.

6. A vehicle as recited in claim 3 wherein said propelling assembly also includes an intermediate bogie wheel located between said front and rear bogie wheels, said front and intermediate bogie wheels being located substantially in the same horizontal plane, said endless track lower portion defining
- a track rear section extending between said intermediate and rear bogie wheels, said endless track rear section being slanted substantially upwardly in the rearward direction;
- a track intermediate section extending between said front and intermediate bogie wheels, said track intermediate section being located below the remainder of said endless track so as to support a greater portion of the weight of said vehicle then other sections of said endless track when said vehicle is normally and statically loaded.

7. A vehicle as recited in claim 6 wherein said slide bar has a slide bar rear segment extending substantially from said intermediate bogie wheel toward said rear bogie wheel for contacting at least a portion of the inner face of said endless track rear section and a slide bar intermediate segment extending between said front and intermediate bogie wheels for contacting at least a portion of the inner face of said endless track intermediate section.

8. A vehicle as recited in claim 3 wherein said driving wheel is located both forwardly and upwardly relative to said front bogie wheel so as to define an endless track front section extending between said driving wheel and said front bogie wheel, said endless track front section being slanted substantially upwardly in the forward direction; said propelling assembly also including an intermediate bogie wheel located between said front and rear bogie wheels, said front and intermediate bogie wheels being located substantially in the same horizontal plane, said endless track lower portion defining
- a track rear section extending between said intermediate and rear bogie wheels, said endless track rear section being slanted substantially upwardly in the rearward direction,
- a track intermediate section extending between said front and intermediate bogie wheels, said track intermediate section being located below the remainder of said endless track so as to support a greater portion of the weight of said vehicle then other sections of said track when said vehicle is normally and statically loaded;
- said track front and intermediate segments defining an obtuse front-to-intermediate segment angle therebetween, said track rear and intermediate segments defining an obtuse rear-to-intermediate angle therebetween, said front-to-intermediate segment angle being smaller then said rear-to-intermediate segment angle.

9. A vehicle as recited in claim 1 wherein said frame front section includes a pair of seat supporting arms extending substantially forwardly from said frame rear section, said seat supporting arms extending on each side of said seat in a substantially proximal relationship with the latter, said seat being exclusively secured to said seat supporting arms so as to allow said seat to be in a proximal relationship with said supporting surface.

10. A vehicle as recited inclaim 9, wherein said seat includes a bench section and a back rest section, said skis and said seat being positioned relative to each other so that at least a portion of said skis is positioned laterally relative to at least a portion of said bench section in register with the latter.

11. A vehicle as recited in claim 9 wherein said frame front section also includes a cabin base wall extending substantially forwardly from said seat supporting arms, said cabin base wall defining a substantially horizontal base wall spacing segment extending from said seat supporting arms and a base wall foot resting segment extending at an angle from said base wall spacing segment; said protective shell being pivotally attached to said cabin base wall for pivotal movement between an open configuration facilitating movement of said driver in and out said seat and a closed configuration wherein said protective shell protectively shields said driver from external elements.

12. A vehicle as recited in claim 1 wherein said steering assembly includes a steering column mechanically coupled to said steering wheel, said steering column extending substantially forwardly and being configured and sized for allowing said driver legs to to extend underneath said steering wheel.

13. A vehicle as recited in claim 1 wherein said steering assembly includes suspension tables and driving rods attached to said skis respectively for resiliently biasing said skis towards said supporting surface and driving said skis, said seat being configured, sized and positioned so as to allow said driver to sit in a substantially recumbent position with said driver legs in a substantially overlying relationship relative to said suspension tables and driving rods.

14. A vehicle as recited in claim 1 wherein at least one of said skis is provided with a braking tongue pivotally attached thereto for selective pivotal movement between a braking configuration wherein said braking tongue protrudes from the gliding surface of said at least one ski to frictionally contact said supporting surface and a gliding configuration wherein said braking tongue is positioned so as not to interfere substantially with said supporting surface.

15. A vehicle as recited in claim 14 wherein said at least one ski is provided with a ski aperture extending therethrough for allowing said braking tongue to pivot between said gliding configuration wherein said braking tongue fills said ski aperture and is in a coplanar relationship with said ski gliding surface and said braking configuration wherein said braking tongue protrudes from said ski gliding surface; said braking tongue being operatively coupled to a tongue actuating means for allowing said driver to selectively pivot said braking tongue.

16. A vehicle as recited in claim 15 wherein said at least one ski is provided with ski flanges extending substantially upwardly therefrom substantially adjacent its lateral edges, said braking tongue being attached to a tongue axle extending between said ski flanges; said tongue actuating means including an actuating piston extending between said at leaat one ski and said braking tongue for selectively pivoting the latter.

17. A vehicle usable by a driver over a supporting surface, said driver having driver legs and driver arms, said vehicle comprising:
 a frame, said frame defining a frame front section and a frame rear section;
 a seat attached to said frame front section for supporting said driver in a sitting position;
 a protective shell attached to said frame front section for supporting said driver in a sitting position;
 a protective shell attached to said frame front section for substantially enclosing said driver;
 a pair of skis for gliding on said supporting surface, said skis being pivotally attached to said frame front section substantially laterally on each side of said cabin, said skis being operatively coupled to a steering wheel located in said cabin by steering assembly for allowing said driver to steer said vehicle by pivoting said skis relative to said frame;
 a propelling assembly including an endless track opertively mounted to said frame rear section rearwardly relatively relative to said seat for contacting said supporting surface and propelling said vehicle;
 a motor mounted on said frame rear section in a substantially overlying and proximal relationship relative to said endless track, said motor being operatively coupled to said endless track for driving the latter;
 said seat and said motor being in a substantially proximal relationship relative to said supporting surface when said skis and said endless track contact said supporting surface; said propelling assembly also including a suspension assembly connecting said endless track relative to said frame rear section and biasing said endless track away from said frame rear section towards said supporting surface; the configuration, size and characteristics of said suspension assembly being selected to also cause the normally and statically loaded vehicle to be supported by said endless track lower portion more towards the front of the latter then towards the rear of the latter.

18. A vehicle as recited in claim 17 wherein said endless track defines a track lower portion and a substantially opposed track upper protion; said propelling assembly also including
 a driving wheel mechanically coupled to said motor, said driving wheel engaging said endless track for driving the latter;
 a slide bar attached to said frame rear section, said slide bar defining a slide bar front end and a longitudinally opposed slide bar rear end; said slide bar being positioned so as to be in sliding contact with the inner face of at least a portion of said endless track lower portion;
 said suspension assembly being configured and sized for allowing said endless track to controllably pivot about said driving wheel.

19. A vehicle as recited in claim 17 wherein said endless track defines a track lower portion and a substantially opposed track upper portion; said propelling assembly also including
 a driving wheel mechanically coupled to said motor, said driving wheel engaging said endless track for driving the latter;
 a slide bar attached to said frame rear section, said slide bar defining a slide bar front end and longitudinally opposed slide bar rear end; said slide bar being positioned so as to be in sliding contact with the inner face of at least a portion of said endless track lower portion;
 a front bogie wheel and a rear bogie wheel for engaging the inner face of said endless track, said front and rear bogie wheels being both rotatably attached to said slide bar for rotation relative thereto respectively substantially adjacent said slide bar front and rear ends;
 said rear bogie wheel and the adjacent portions of said endless track being elevated above said front bogie wheel and adjacent portions of said endless track.
 said driving wheel being located both forwardly and upwardly relative to said front bogie wheel so as to define an endless track front section extending between said driving wheel and said front bogie wheel, said endless track front section being slanted substantially upwardly in the forward direction;
 said slide bar having a slide bar front segment extending substantially from said front bogie wheel towards said driving wheel for contacting at least a portion of the inner face of said endless track front section;
 said propelling assembly also including an intermediate bogie wheel located between said front and rear bogie wheels, said front and intermediate bogie wheels being located substantially in the same horizontal plane, said endless track lower portion defining
 a track rear section extending between said intermediate and rear bogie wheels, said endless track rear section being slanted substantially upwardly in the rearward direction.
 a track intermediate section extending between said front and intermediate bogie wheels, said track intermediate section being located below the remainder of said endless track so as to support a greater portion of the weight of said vehicle then other sections of said track when said vehicle is normally and statically loaded;
 said slide bar having a slide bar rear segment extending substantially from said intermediate bogie wheel toward said rear bogie wheel for contacting at least a portion of the inner face of said endless track rear section and a slide bar intermediate segment extending between said front and intermediate bogie wheels;
 said frame rear section defining a rear section front end location substantially adjacent said frame front section and a longitudinally opposed rear section rear end;

said suspension assembly including a first suspension arm, said first suspension arm being pivotally coupled to said frame rear section substantially adjacent said rear section rear end, said first suspension arm defining a first arm first segment protruding above said frame rear section and a first arm second segment extending below said frame rear segment, said first suspension arm extending generally at an angle and downwardly in a rearward direction;

a second suspension arm pivotally attached at opposed longitudinal ends thereof respectively to said first suspension arm adjacent a lower end of the latter and to said slide bar rear segment;

a third suspension arm, said third suspension arm being pivotally attached at opposed longitudinal ends thereof respectively to said frame rear section front end and to said slide bar intermediate segment;

a first suspension biasing component mounted between said frame rear section in front of said first suspension arm and said first arm first segment for biasing said first arm first segment away from said frame rear section;

a second suspension biasing component mounted between said frame rear section in front of said third suspension arm and said slide bar adjacent the intersection between said slide bar front and intermediate segments for biasing said slide bar away from said frame rear section.

* * * * *